Nov. 25, 1958  J. R. PIER  2,861,595
PULSATION DAMPENER DEVICE
Filed Nov. 25, 1955
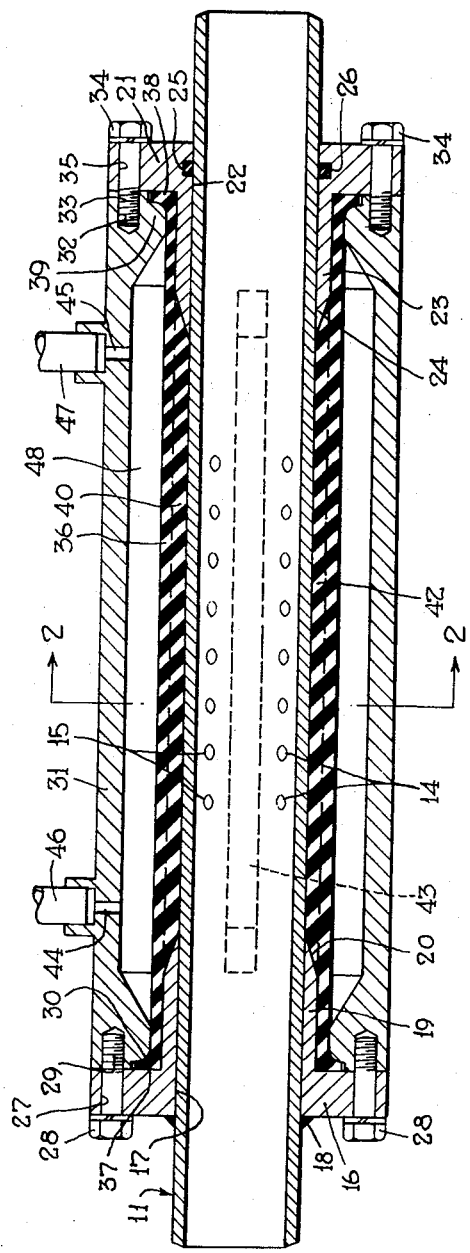
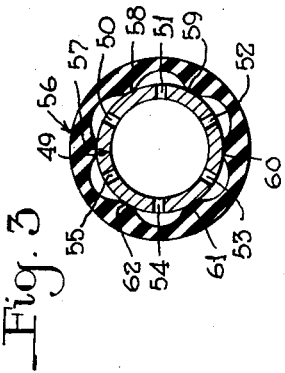
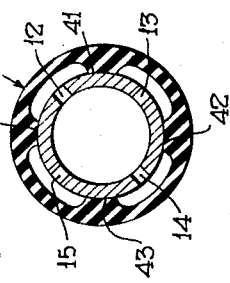
INVENTOR.
Jerome R. Pier
BY
Adelbert O. Steinmiller
ATTORNEY

United States Patent Office 2,861,595
Patented Nov. 25, 1958

2,861,595

PULSATION DAMPENER DEVICE

Jerome R. Pier, Irwin, Pa., assignor to Westinghouse Air Brake Company, Wilmerding, Pa., a corporation of Pennsylvania Application November 25, 1955, Serial No. 549,014

1 Claim. (Cl. 138—30)

This invention relates to pulsation damping and surge absorbing apparatus used in pipe lines and piping systems, and more particularly to apparatus of such a type which includes a resilient member adapted to change its position to accommodate temporary increases in a fluid volume resulting from momentary surges and pulsations.

Prior art devices having resilient members, for example resilient sleeves composed of rubber or other suitable material, are well known but are characterized by a number of shortcomings and disadvantages. For example, the resilient sleeve may come into frictional contact with a supporting member, for example, a perforated mandrel, thereby causing wear on the sleeve and its ultimate rupture, or the sleeve during surges of pressure may be so distended away from the supporting mandrel as to make contact with an enclosing chamber wall thereby causing additional wear. It also happens that the resilient sleeve or other resilient member becomes so distended during opeartion that its limit of elasticity is exceeded, with the result that the sleeve does not return to normal when the surge has passed. Such a condition often results in undesirable stresses within the sleeve which cause its ultimate rupture and render it unfit for further service.

The apparatus of the instant invention overcomes these and other disadvantages, and in its broader aspects comprises a resilient sleeve having means for reducing the stress in the sleeve wall due to bending and stretching of the sleeve. This is accomplished by providing the resilient sleeve with a plurality of reinforcing ribs, ridges, or lobes which may be molded to the internal surface of the sleeve or formed integrally with the sleeve. These ribs support the sleeve on the mandrel and space the sleeve from the mandrel, and cause the sleeve to collapse into predetermined creases or folds during the rarefaction part of the surge wave thereby preventing the formation of sharp and damaging folds. This also results in decreasing stress concentrations which cause premature sleeve ruptures. A mandrel or perforated pipe section is employed with the sleeve which has a plurality of rows of throttling orifices spaced around the periphery thereof, and which rows have predetermined positions with respect to the ribs of the sleeve while the sleeve is mounted on the mandrel or perforated pipe section. The aforementioned ribs or ridges also have the advantage of reducing the frictional contact between the inner surface of the sleeve and the outer surface of the mandrels, and they also provide a sleeve in which a certain amount of movement to and away from the supporting mandrel may take place without any substantial expansion or stretching of the sleeve itself, thereby providing a sleeve in which a considerable enlargement in the volume between the sleeve and the mandrel can take place without reaching the limit of elasticity of the material which composes the sleeve.

It is accordingly a primary object of the present invention to provide new and improved pulsation dampening and surge absorbing apparatus.

Another object is to provide new and improved pulsation dampening and surge absorbing apparatus of the type in which a resilient member changes its position or volume as fluid flows into the member when a pressure surge occurs, to thereby provide for dampening the surge.

Another object is to provide new and improved pulsation dampening and surge absorbing apparatus which is characterized by long and trouble-free life.

Another object is to provide new and improved pulsation dampening and surge absorbing apparatus employing a resilient member in which frictional contact between the resilient member and the supporting means therefor is reduced to a minimum.

Still another object is to provide pulsation dampening and surge absorbing apparatus having new and improved resilient sleeve means for use therein.

A further object of the invention is to provide a new and improved resilient sleeve for use in pulsation dampening and surge absorbing apparatus.

Still a further object is to provide new and improved resilient sleeve means having means on the inside thereof for controlling the collapse of the sleeve means against the surface of a supporting member.

Other objects and advantages will become apparent after a perusal of the accompanying specification when read in connection with the accompanying drawings in which—

Fig. 1 is a cross-sectional view through the longitudinal axis of the preferred embodiment of pulsation dampening and surge absorbing apparatus constructed according to this invention;

Fig. 2 is a cross-sectional view of the sleeve and mandrel taken along the line 2—2 of Fig. 1; and Fig. 3 is a cross-sectional view of the sleeve and mandrel of a second embodiment of the invention.

Referring now to the drawings for a more detailed understanding of the invention, and in which like reference characters are used throughout to designate like parts, there is shown a mandrel or perforated pipe section generally designated by the reference numeral 11. This mandrel or perforated pipe section may be connected in the fluid line in any convenient manner so that fluid, from which surges are to be removed, flows through the mandrel. For example, the member 11 may have threaded ends (not shown) for use with conventional pipe couplings. Whereas for convenience of illustration only the embodiment of the invention is shown in which fluid flows through the device, it is to be understood that one end of the apparatus could be closed, as by a cap or other convenient means, and the other end connected to the fluid line by, for example, a T-joint. The member 11 has a perforated portion which has therein a plurality of throttling orifices, which may be arranged in rows. Whereas four rows are shown, generally designated by the reference numerals 12, 13, 14 and 15, it is to be understood that the invention is not limited to the use of four rows of throttling orifices, but that any convenient number of rows can be employed. An end plate or end disc 16 has a bore or aperture 17 therein which fits snugly around the outside of member 11 and is suitably secured to one end thereof as by welding at 18. Member 16 has an annular portion 19 extending inwardly therefrom, portion 19 having a tapered surface 20 for reasons to be hereinafter made apparent.

Mounted upon the other end of member 11 is a second end plate or disc 21 having a bore or opening 22 therein for snugly receiving the other end of member 11. Member 21 has the inwardly extending ring portion 23 having a tapered end 24 as shown. Preferably member 21 has a groove or a slot 25 therein for receiving a sealing ring 26. If desired, aforementioned end plate 16 may have a groove, not shown, therein for receiving a sealing ring, not shown. The aforementioned end plate 16 has bores 27 therein for receiving bolts 28, the threaded end 29 of the bolt 28 making threaded engagement, as shown, in a threaded bore in one end of a cylindrical casing or housing member 31. The other end of housing member 31 has threaded bores 32 therein for making threaded engagement with the threaded portions 33 of bolts 34, the shank of each of which passes through a corresponding bore 35 in end plate 21, thereby securely fastening the end plates 16 and 21 to the ends of housing or cylinder 31, and further securing them in predetermined relative positions on member 11.

A resilient sleeve member generally designated 36 is mounted around the perforated portion of pipe 11 as shown, and the ends of the sleeve member extend beyond the perforated portion. The sleeve member has flange portions 37 and 38 on the ends thereof which are held in place and may be compressed by the overhanging lip portions 30 and 39 respectively of the ends of casing member 31. Accordingly, sealing means is provided between the end plates 16 and 21 and the cylinder or housing means 31. Housing member 31 and sleeve 36 form an enclosed chamber 48, for reasons to be hereinafter apparent. Resilient sleeve 36 has four inwardly extending ribs or ridges which are preferably substantially parallel to the longitudinal axis of the sleeve member, the ribs being designated by the reference characters 40, 41, 42 and 43. The ribs are circumferentially spaced on the inside of the sleeve, and may have therebetween the rows of throttling orifices as shown in Fig. 2. The ribs space the remainder of the sleeve from the mandrel. The cylindrical casing or housing member 31 has bores 44 and 45 therein for receiving pipes or conduits 46 and 47. It is to be understood that pipe 46 has connected thereto a pressure gauge, not shown, for indicating the pressure in the chamber 48 formed between the outer surface of member 36 and the wall of member 31. The other pipe 47 is provided for bringing fluid under pressure, for example, compressed air, into the chamber 48, and a valve (not shown) is provided in pipe 47 for adjusting the pressure in chamber 48 and maintaining it at a preselected value.

In the operation of the apparatus, assume by way of example that the chamber 48 is charged to a pressure approximating the normal pressure in the fluid which flows through the mandrel or perforated pipe member 11. While the pressure in the fluid is normal, it is to be understood that fluid flows through the rows of orifices 12, 13, 14 and 15 into the spaces between the sleeve and the other surface of the mandrel 11, and the resilient sleeve member designated 36 may assume a position such for example as that shown in Fig. 2 in which the sleeve member has its normal, rounded shape, and is positioned a distance from the outer surface of member 11 corresponding to the thickness of the ribs.

When a temporary surge or increase in pressure occurs in the fluid passing through the line, fluid flows through the aforementioned orifices and may cause the sleeve 36 to expand circumferentially and increase the volume defined by the inner surface of the sleeve and the outer surface of the mandrel. This expansion, it will be understood, is against the pressure in chamber 48, and the degree of expansion will be determined in part by the relative pressure of the fluid in the line and the pressure in chamber 48. The pressure in chamber 48 may if desired be adjusted so that the expansion of member 36 is limited to a value which does not exceed the limit of elasticity of the material, for any pressure developed during the surges in the line and the pressure in chamber 48 may if desired be adjusted so that the member 36 may expand at peak pressures in the line until the member 36 lies against the inner wall of cylindrical housing 31, if such a degree of expansion does not exceed the limit of elasticity of the material of which the sleeve is composed.

After the surge of pressure has passed the pressure in the line may return to normal, but there will ordinarily be a rarefaction or a temporary reduction in pressure in the fluid in the line below its normal value. The pressure of the compressed air in chamber 48 pressing against the member 36 causes the fluid between the sleeve member 36 and the mandrel 11 to flow back through the throttling orifices 12, 13, 14 and 15 into the line, and the member 36 may be so completely collapsed by the pressure in chamber 48 that portions thereof make contact with the outer surface of the mandrel 11. However, the aforementioned ribs 41, 42, 43 and 44 control the collapse of the sleeve 36 so that during the collapse of the sleeve undesired stresses and strains in the material do not occur, sharp folds do not occur, and frictional contact between the resilient sleeve 36 and the member 11 is reduced to a minimum, thereby decreasing the wear on the member 36 and enhancing its useful life.

Particular reference should be made now to Fig. 3 in which a modification of the invention is shown. The mandrel or perforated pipe section is generally designated by the reference numeral 49 and has six longitudinal rows of throttling orifices therein designated 50, 51, 52, 53, 54 and 55. The resilient sleeve is generally designated by the reference numeral 56 and has six inwardly extending ribs or ridges 57, 58, 59, 60, 61 and 62. It is to be noted that these last named ridges have their tops rounded to thereby further decrease frictional contact with the mandrel 49, the sleeve 56 operating in the same manner as the aforedescribed sleeve 36. It is to be understood that the remainder of the apparatus embodying the invention of Fig. 3 may be similar to that of Fig. 1.

The ratio between the area of the central passages in mandrels 11 and 49 and the total of the areas of all the throttling orifices may be that which is deemed most desirable, and this invention is not limited to any particular ratio.

Whereas the invention has been shown and described with respect to two embodiments thereof, it is to be understood that various changes and modifications in structures may be made without departing from the scope of the invention.

Having now described the invention, what I claim as new and desire to secure by Letters Patent, is:

Pulsation dampening apparatus for absorbing pressure surges in a conduit conveying fluid at a variable pressure, said apparatus comprising in combination, a tubular mandrel connectable to the conduit, said mandrel having a plurality of throttling orifices therethrough arranged in spaced longitudinally extending rows about the circumferential outer surface thereof, casing means, and a resilient sleeve disposed within said casing means and surrounding said mandrel and sealingly secured adjacent its respective ends between said casing means and mandrel, said casing means providing a chamber surrounding the outer surface of the resilient sleeve and charged with fluid at a preselected pressure corresponding to the normal pressure of fluid in the conduit, said sleeve having a plurality of spaced inwardly directed ridges extending in a direction substantially parallel to the longitudinal axis of said sleeve, each ridge normally engaging the outer circumferential surface of the mandrel intermediate the spaced longitudinal rows of said orifices, the inner surface of the sleeve combining with the outer circumferential surface of said mandrel to define a variable volume constantly open to the conduit via the throttling orifices, said resilient sleeve being flexible radially outward responsively to a surge-induced increase in fluid pressure in said volume above that in said chamber to absorb said increase in fluid pressure, and said resilient sleeve being responsive to a decrease in fluid pressure in said volume below that in said chamber, after such surge has passed, to collapse radially inward in a predetermined controlled pattern defined by deflection of the portions of said sleeve intermediate said ridges toward engagement with the outer circumferential surface of said mandrel thereby to prevent the creation of sharp folds in said sleeve during such collapse.

References Cited in the file of this patent

UNITED STATES PATENTS

| | | |
|---|---|---|
| 2,283,439 | Herman | May 19, 1942 |
| 2,543,585 | Miller | Feb. 27, 1951 |
| 2,677,393 | Cornelius | May 4, 1954 |
| 2,712,831 | Day | July 12, 1955 |

FOREIGN PATENTS

| | | |
|---|---|---|
| 13,976 | Great Britain | Oct. 14, 1887 |